United States Patent [19]
van der Meer et al.

[11] Patent Number: 5,833,779
[45] Date of Patent: *Nov. 10, 1998

[54] WINTER AUTOMOBILE OR LIGHT TRUCK TIRE INCLUDING SIPES

[75] Inventors: Alex van der Meer, Luxembourg, Germany; Paul Bryan Maxwell, Munroe Falls, Ohio

[73] Assignee: The Goodyear Tire & Rubber Company, Akron, Ohio

[ * ] Notice: The term of this patent shall not extend beyond the expiration date of Pat. No. 5,647,926.

[21] Appl. No.: 625,953

[22] Filed: Apr. 1, 1996

Related U.S. Application Data

[63] Continuation-in-part of Ser. No. 570,951, Dec. 12, 1995.

[51] Int. Cl.$^6$ .................................................. B60C 11/12
[52] U.S. Cl. ............................... 152/209 R; 152/DIG. 3
[58] Field of Search ........................... 152/209 R, 209 F, 152/DIG. 3

[56] References Cited

U.S. PATENT DOCUMENTS

| | | | |
|---|---|---|---|
| D. 328,583 | 8/1992 | Graas et al. | D12/147 |
| D. 333,455 | 2/1993 | Himuro et al. | D12/147 |
| D. 334,367 | 3/1993 | White | D12/147 |
| D. 334,368 | 3/1993 | White | D12/147 |
| D. 334,370 | 3/1993 | White | D12/147 |
| D. 334,371 | 3/1993 | Hodges | D12/147 |
| D. 341,345 | 11/1993 | Killian | D12/146 |
| D. 347,606 | 6/1994 | Mehta | D12/147 |
| D. 350,099 | 8/1994 | Manestar . | |
| D. 350,320 | 9/1994 | Suzuki | D12/147 |
| D. 350,507 | 9/1994 | Helluin | D12/141 |
| D. 350,513 | 9/1994 | Mehta et al. | D12/147 |
| D. 354,026 | 1/1995 | McKisson | D12/146 |
| D. 354,036 | 1/1995 | McKisson | D12/148 |
| D. 354,725 | 1/1995 | McKisson | D12/146 |
| 2,620,009 | 2/1952 | Giebhart | 152/209 |
| 4,298,046 | 11/1981 | Herbelleau et al. | 152/209 R |
| 4,598,747 | 7/1986 | Flechtner | 152/209 R |
| 4,690,189 | 9/1987 | Bradisse et al. | 152/209 R |
| 4,815,511 | 3/1989 | Brayer et al. | 152/209 R |
| 5,198,047 | 3/1993 | Graas et al. | 152/209 R |
| 5,361,816 | 11/1994 | Hitzky | 152/209 R |
| 5,385,189 | 1/1995 | Aoki et al. | 152/209 R |
| 5,388,625 | 2/1995 | White | 152/209 R |
| 5,435,366 | 7/1995 | Voigt et al. | 152/209 R |
| 5,454,411 | 10/1995 | Weyrich et al. | 152/209 D |

FOREIGN PATENT DOCUMENTS

| | | | |
|---|---|---|---|
| 330644 | 8/1989 | European Pat. Off. | 152/209 D |
| 475929 | 3/1992 | European Pat. Off. | 152/209 R |
| 0613794 | 2/1994 | European Pat. Off. | B60C 11/11 |
| 0640498 | 8/1994 | European Pat. Off. | B60C 11/11 |
| 0671288 | 1/1995 | European Pat. Off. | B60C 11/03 |
| 2095240 | 6/1971 | France . | |
| 1037961 | 11/1986 | Japan . | |
| 9008 | 1/1989 | Japan | 152/DIG. 3 |
| 133205 | 5/1990 | Japan | 152/209 R |
| 143707 | 6/1991 | Japan | 152/209 R |
| 157209 | 7/1991 | Japan | 152/209 D |
| 319022 | 12/1993 | Japan | 152/209 R |

OTHER PUBLICATIONS

Patent Abstracts of Japan; Publication Number 03176210.
Patent Abstracts of Japan; Publication Number 62241710.

*Primary Examiner*—Steven D. Maki
*Attorney, Agent, or Firm*—David L. King

[57] ABSTRACT

A radial pneumatic light truck or automobile tire 10 having a tread 12 which has a plurality of traction elements 20,30 aligned in rows and separated by wide circumferential grooves 24 and a plurality of narrow laterally inclined grooves 26,36. Each traction element 20,30 is divided into at least three zigzag portions by a plurality of wavy patterned sipes 28,38. The wavy pattern of sipes 28 within the central rows of traction elements 20 are laterally extending. The wavy pattern sipes 38 in the shoulder rows are circumferentially extending. The preferred tire 10 has the laterally extending narrow grooves 26 being wavy and along with the wavy sipes 28 of a traction element 20 having peak amplitudes (A) aligned along a linear path (L) inclined at an angle θ, relative to the equatorial plane (EP). Axially adjacent central rows of traction elements 20 are oppositely inclined.

19 Claims, 8 Drawing Sheets

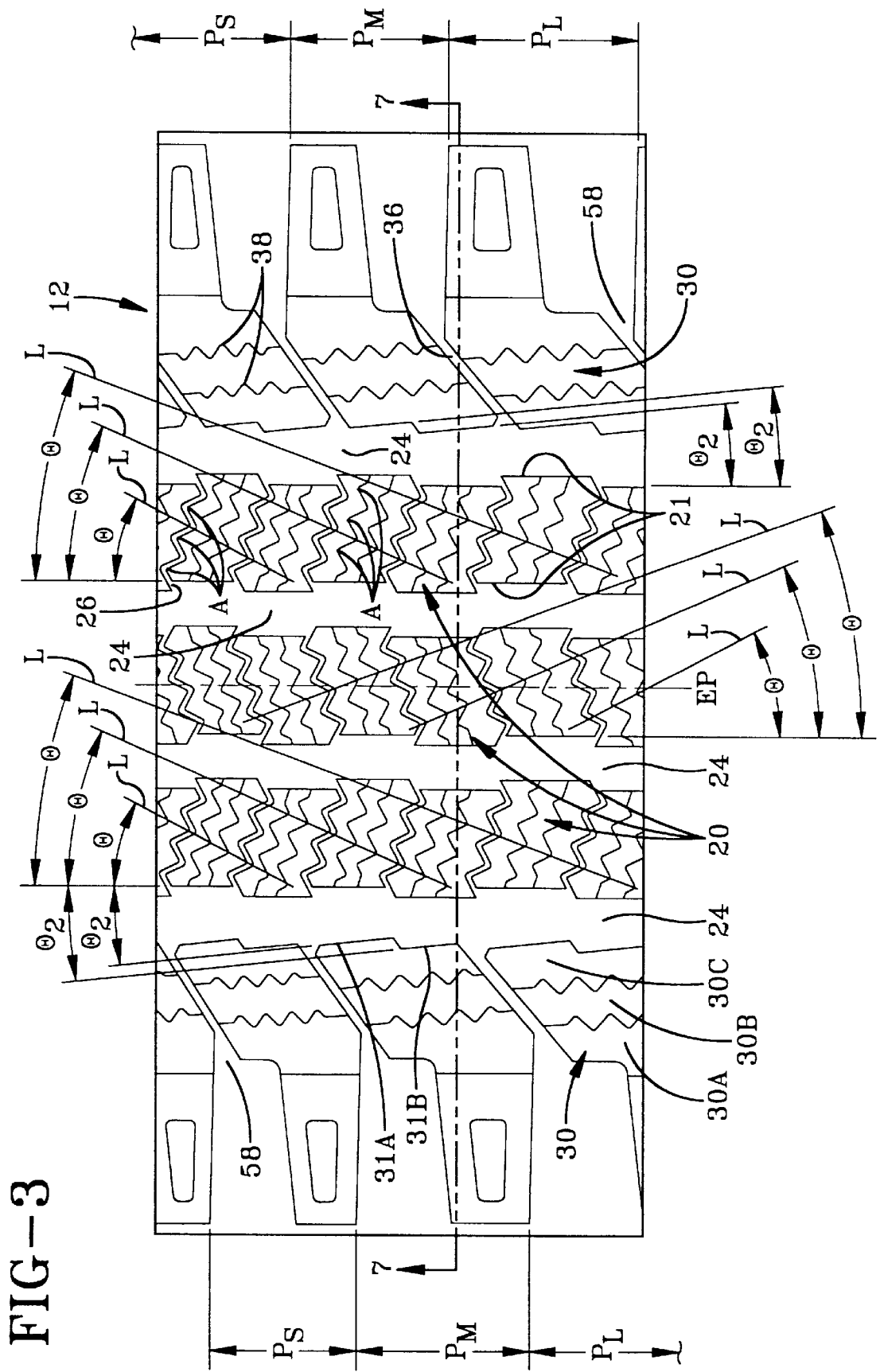

WINTER AUTOMOBILE OR LIGHT TRUCK TIRE INCLUDING SIPES

This application is a continuation in part of application Ser. No. 08/570,951 filed Dec. 12, 1995.

BACKGROUND OF THE INVENTION

The present invention is related to a tread for a vehicle tire. In particular, the present invention relates to improvements to the tread of an automobile or light truck tire which is particularly well adapted for winter travel under snowy and icy conditions.

Winter or snow tires have historically been designed with treads having large traction lugs that were widely spaced yielding a very low road contacting surface within the tires normally loaded footprint. These open tread patterns are excellent in deep snow. However, due to the large lugs and open tread pattern these tires are notorious for generating substantial noise and vibration when used on rain soaked or dry paved roads. The tread wear rate is rapid and therefore these tires are considered for use only during the snowy winter months. These tires are not particularly well suited for icy road conditions.

Many driving enthusiasts have chosen to use all season type treads. These tread patterns employ wide transverse grooves and circumferential grooves defining discrete tread elements. The tread patterns are substantially more closed than a pure snow tire yet are sufficiently open to provide good snow traction and overall acceptable tread wear and noise performance. The primary advantage to the all season tread is that the tires can be used year round. A fundamental disadvantage is that the tires are not as good as snow tires in severe winter conditions and can be particularly poor in icy or freezing rain conditions.

Under these icy road conditions metal studs or cleats are considered the optimal traction solution. Unfortunately in many localities the use of such traction aides is prohibited because of the tremendous road damage that can result and in those areas where these types of studded tires are permitted the legal use is generally limited in duration.

The use of treads having a high density of sipes within the traction elements has been determined to provide a good improvement to both snow and ice traction performance. Such heavily bladed tires can exhibit good winter ice traction performance by providing an increase number of tread edges to provide forward traction.

One particularly significant prior art winter tire exhibiting the employment of multiple bladed sipes combined with a plurality of circumferential and transverse grooves is disclosed in U.S. Pat. No. 5,198,047. This tire, commonly known as the Goodyear Ultra Grip 4 Tire, has a directional tread pattern. That is the tread had a preferred direction of travel adapted to yield superior traction in one direction. This directional tread pattern was symmetrical about the equatorial plane of the tire. The sipes were arranged angularly similar within each tread half and oppositely tread half to tread half to further enhance the directional traction performance by insuring a first portion of the sipe always enters and leaves the footprint prior to the second or trailing portion. The tire has demonstrated excellent directional traction and reasonable noise properties. The tire tread of the present invention although useable in these directional type tread patters is especially well adapted to provide excellent all direction travel thus making the tread nondirectional, which is a most beneficial feature in a winter tire.

The present invention employs narrow transverse grooves and a novel arrangement of wavy sipes so as to achieve a winter tire having excellent snow and ice traction properties in all directions of travel including forward, backward and during turning or cornering maneuvers. The tread pattern also exhibits very low noise and has interlocking traction elements that greatly reduces the Residual Self-Aligning Torque (RSAT) that is commonly exhibited in such tires.

SUMMARY OF THE INVENTION

A radial pneumatic light truck or automobile tire 10 having a tread 12 having low noise generation and particularly well suited for snow and ice traction is described.

The tread, when incorporated in the tire 10, has an axis of rotation (A/R), a pair of lateral edges 14,16, a tread width (TW) defined as the axial distance between lateral edges 14,16, and an equatorial plane (EP) perpendicular to the axis of rotation (A/R) and spaced equivalent from the lateral edges 14,16.

The tread 12 has a tread base 18, a plurality of traction elements 20,30 extending radially outwardly from the tread base 18, a plurality of circumferentially continuous wide grooves 24, a plurality of narrow laterally extending grooves 26,36 and a plurality of sipes 28,38.

The circumferentially continuous wide grooves 24 extend radially from the tread base 18 and divides the plurality of traction elements 20,30 into a plurality of rows of traction elements. One shoulder row is adjacent each lateral edge 14,16 and two or more central rows of traction elements 20 are deposed between the shoulder rows.

The tread has a plurality of narrow laterally inclined grooves 20,30 one such groove 26,36 separating each circumferentially adjacent traction element 20,30. In the preferred embodiment the narrow grooves 26 separating the traction elements 20 of the central rows are of a wavy pattern having at least three equal peak amplitudes (A). The wavy patterned sipes 28 extend across and divide each traction element 20 within the central rows into at least two preferably three zigzag portions. The wavy patterned sipes 28 preferably have two or more substantially equal peak amplitudes (A). In the preferred embodiment one peak amplitude (A) of each of the sipes 28 and each of the narrow grooves 26 of each traction element 20 within a central row is aligned in a linear path (L), the linear path (L) is inclined relative to the equatorial plane (EP) at an angle $\zeta$, $\theta$ being less than 45°. Axially adjacent central rows have the linear path (L) oppositely inclined relative to the linear path (L) of an axially adjacent central row of traction elements 20.

The wavy sipes 38 of the shoulder row traction elements 30 are circumferentially extending and divide each traction element 30 into at least two, preferably three circumferentially extending zigzag portions.

The combination of wavy sipes 28,38 and grooves 24,26, 38 as arranged across the tread 12 provide excellent snow and ice traction. The interlocking tread elements 20,30 are highly flexible with lengthy blade edge surfaces for snow and ice traction in all directions of travel. The shoulder siping 38 creates enhanced traction of the tread 12 during cornering maneuvers. This greatly helps the driver to maintain control of the vehicle in the circumstance most likely to induce a slippage of the tread 12 on the icy road surface. Prior art tire designers heretofore have made elongated lateral extending lugs for high lateral stiffness. The present invention goes against that conventional wisdom by dividing the shoulder traction element 30 into at least three portions increasing the lateral flexibility and providing circumferential blade edges to provide icy condition cornering traction as will be discussed in the detailed description of the invention.

DEFINITIONS

"Aspect Ratio" means the ratio of a tire's section height to its section width.

"Asymmetric tread" means a tread that has a tread pattern not symmetrical about the centerplane or equatorial plane (EP) of the tire.

"Axial" and "axially" means lines or directions that are parallel to the axis of rotation of the tire. "Block Element" means a tread element defined by a circumferential groove or shoulder and a pair of lateral extending grooves.

"Circumferential" means lines or directions extending along the perimeter of the surface of the annular tread perpendicular to the axial direction.

"Compensated tread width" means the tread width multiplied by the aspect ratio.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tire bars" tending to maintain a rib-like character in the tread region involved.

"Inboard side" means the side of the tire nearest the vehicle when the tire is mounted on a wheel and the wheel is mounted on the vehicle.

"Lateral" means an axial direction.

"Net contact area" means the total area of ground contacting elements between defined boundary edges divided by the gross area between the boundary edges as measured around the entire circumference of the tread.

"Net-to-gross ratio" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber of the tread which is defined by at least one circumferential groove and either a second such groove or a lateral edge, the strip being laterally undivided by full-depth grooves.

"Sipe" means small slots molded into the tread elements of the tire that subdivide the tread surface and improve traction.

"Tread element" or "traction element" means a rib or a block element.

BRIEF DESCRIPTION OF THE DRAWINGS

FIG. 3 is a view of a portion of the tread pattern of the tire shown in FIG. 2.

DETAILED DESCRIPTION OF THE INVENTION

Figure 1:
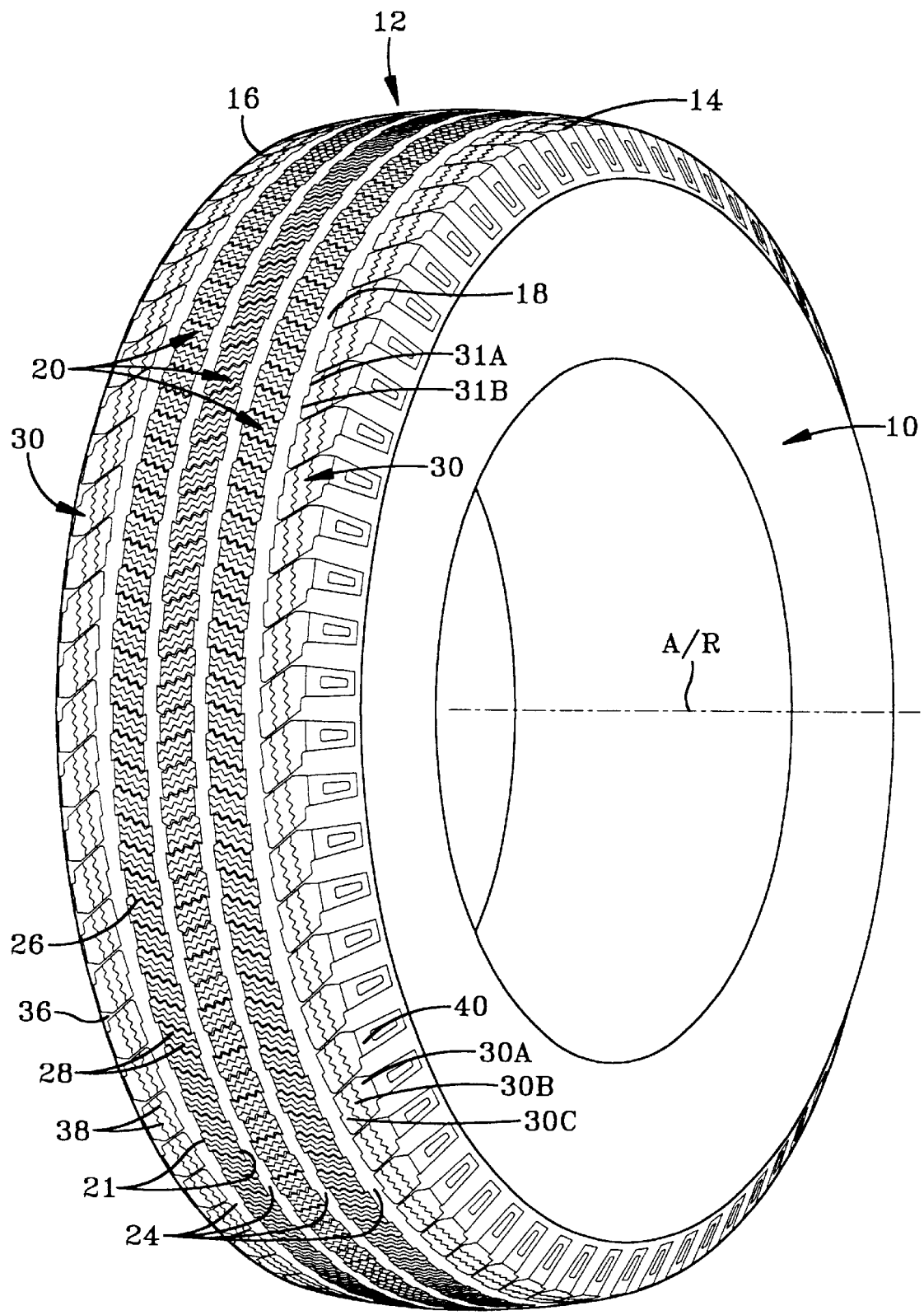
FIG. 1 is a perspective view of the preferred embodiment tire according to the present invention.
Figure 2:
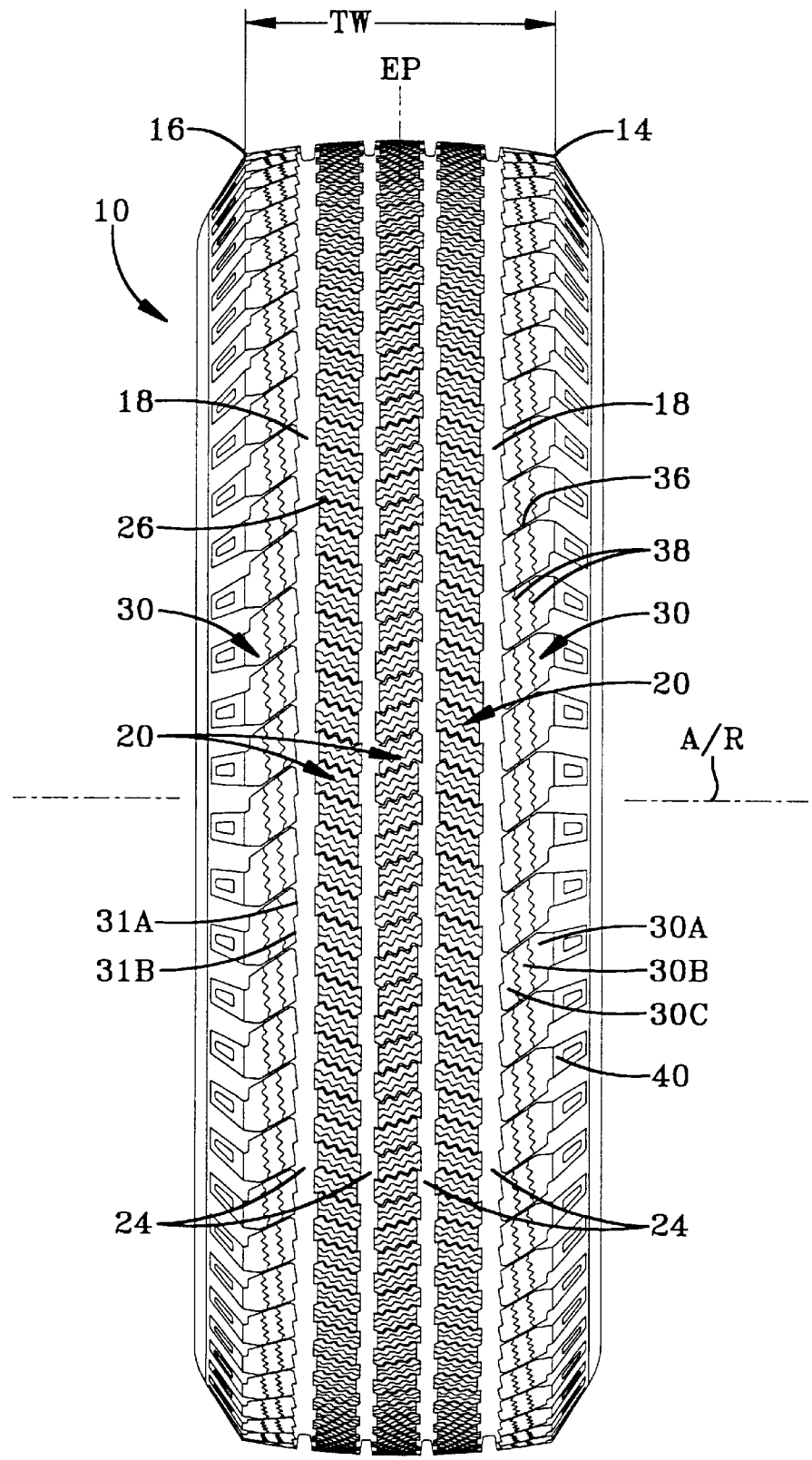
FIG. 2 is a plan view of the tire of FIG. 1.

Referring to FIGS. 1 and 2, a perspective view and a plan view of the radial ply pneumatic light truck or automobile tire 10 according to the preferred embodiment of the invention is shown. The tire 10 has a tread 12. The tread 12 when incorporated in the tire 10 has an axis of rotation (AR), a pair of lateral edges 14,16, a tread width (TW) defined as the axial distance between lateral edges 14,16 and an equatorial plane (EP). The equatorial plane (EP) is a plane perpendicular to the axis of rotation and spaced equidistant from the lateral edges 14,16.

The tread has a tread base 18, a plurality of traction elements 20,30 extending radially outwardly from the tread base 18, a plurality of circumferentially continuous wide grooves 24, a plurality of narrow laterally extending grooves 26,36 separating circumferentially adjacent traction elements 20,30 and a plurality of laterally extending wavy patterned sipes 28 and a plurality of circumferentially extending wavy patterned sipes 38.

The circumferentially continuous wide grooves 24 divide the plurality of traction elements 20,30 into a plurality of rows of traction elements. One shoulder row of traction elements 30 is adjacent each lateral edge 14,16 and two or more central rows of traction elements 20 is deposed between the shoulder rows. In the illustrated preferred embodiment the tread is divided into five rows of traction elements, two shoulder rows and three central rows, by four circumferentially continuous wide grooves 24.

As shown in FIG. 3, the narrow grooves 26 separating the traction elements 20 of the central rows are of a wavy pattern having at least three substantially equal peak amplitudes (A).

The laterally extending wavy patterned sipes extend across and divide each traction element 20 within the central rows into at least three zigzag portions. The wavy patterned sipes 28 have two or more substantially equal peak amplitudes (A).

The preferred embodiment tread has one peak amplitude (A) of each of the sipes 28 and each of the narrow grooves 26 of each traction element 20 within a central row aligned in a linear path (L). The linear path (L) is inclined relative to the equatorial plane at an angle θ, θ being less than 45°.

The traction elements 20 of axially adjacent central rows have the linear path (L) oppositely inclined relative to the linear path (L) of an axially adjacent central row of traction elements. As shown in FIG. 3 linear path (L) has an orientation θ in the central row nearest the lateral edge 14 which varied due to the pitching of the tread elements 20. Orientation θ is 20° for the largest pitch $P_L$, 24° for the medium pitch $P_M$ and 28° for the smallest pitch $P_S$. The central row of traction elements 20 at the equatorial plane has the orientation θ, being respectively −20°, −24°, −28°, for the large, medium, and small pitches respectively. The central row nearest the lateral edge 16 has the orientation θ, being respectively 20°, 24°, 28°, for the large, medium, and small pitches, respectively. These angularly inclined alignments of the tread elements 20 at the location of the peak amplitudes in combination with the interlocking fitment of adjacent tread elements 20 within a row can be arranged to contribute to the reduction of residual self aligning torque commonly referred to as RSAT. The tire engineer can selectively incline the path (L) to create a torque or bending moment in each row of traction elements relative to the equatorial plane. Depending on the tire carcass and numerous other factors the linear path (L) can be selected to generate an offsetting torque.

As can be seen from the FIGS. 1 through 3 the traction elements 20 of the central rows have substantially straight circumferentially extending ends 21 adjacent the wide circumferential groove 24. The circumferentially adjacent elements 20 within each row have the axial ends 21 axially offset relative to the other adjacent traction elements 20 in repeating sequence. The amount of axial offset is preferably at least approximately a length of one half the peak amplitude (A) of the wavy pattern groove or sipe. The axial offset of the ends 21 creates added traction surfaces in the snow.

Referring to FIGS. 1 through 3 the tread 12 has shoulder rows with traction elements 30 adjacent at least one, preferably both lateral edges 14,16. The elements 30 within the shoulder rows are separated by a narrow laterally extending inclined groove 36. These traction elements have a circumferential extent or length approximately twice that of the circumferential length of the traction elements 20 of the central rows. As illustrated each traction element 30 has an end 31 having two parallel straight portions 31A,31B adjacent the circumferential groove 24. Both straight portions are inclined relative to the equatorial plane at an angle $θ_2$, $θ_2$ being less than 45° and opposite in inclination of the linear path (L) of the axially adjacent central row. This arrangement of the ends 31A,31B is complimentary to the reduction of RSAT generation and likewise can be increased in inclination to generate a somewhat compensating torque within the row. It must be appreciated that the further the row is away from the equatorial plane the less inclination is needed to induce a compensating moment or torque.

An interesting and very novel feature shown in the shoulder row of traction elements 30 is the wavy patterned sipes 38. Two or more such circumferentially extending wavy pattern sipes 38 extend across the traction element 30 intersecting the narrow lateral grooves 36 dividing the traction element 30 into three portions 30A,30B,30C. The three portions 30A,30B, and 30C have interlocking adjoining zigzag ends defined by the wavy sipes 38.

Conventional wisdom has directed the tire engineer to axially elongate shoulder elements and to buttress such features to create lateral stiffness when the tire is subjected to cornering maneuvers. The tire 10 of the present invention deliberately divides the element 30 into three distinct but cooperating portions which have sufficient lateral stiffness enhanced by a shoulder extension 40 integral to the portion 30A. The shoulder extension 40 connects the element 30 to the upper shoulder region of the tire 10. Under turning maneuvers the three portions 30A,30B,30C are flexed into the adjoining portion each portion providing lateral resistance and contributing to the stiffness of the element 30. Most importantly the circumferential sipes 38 provide elongated biting edges to grip the iced over road. The tire engineer in the past has provided forward and backward traction for ice but once the steer tire are turned relative to the direction of travel the effective traction is greatly diminished. The present invention recognizes that the driver has to turn the vehicle when driving and has accounted for this fact by adding the elongated wavy sipes 38 in the shoulder elements 30.

A particularly beneficial feature of the wavy sipes 28,38 is the amount of peak amplitude A provided as shown in FIGS. 1–3. The peaks are formed with an included angle approximating normal or perpendicular creating almost isosceles triangular features, the distance between peaks being about equal to the amplitude (A). The effective length of such sipe is almost twice that of the overall length of the element 20,30. This greatly increases the length of tread edges provided to grip the road surface. The sipes 28 of the center row are inclined primarily laterally, however, due to the sharp zigzag and pronounced amplitude (A) about half of the edge length of any given sipe 28 is normal to the direction of travel during turning maneuvers. The overall effect is a much more controllable tire particularly on ice, regardless of the direction of travel. The tire of the present invention has excellent starting and stopping straight line traction while exhibiting far superior turning traction compared to tires of the prior art.

Referring to FIGS. 4A through 4E cross sections of portions of the tread 12 are shown. These cross sections reflect the radial depth of the sipes 28,38 and the narrow lateral grooves 26,36 relative to the tread base 18. The radial depths of sipes generally are not greater than the depth of the main grooves usually somewhat less. Furthermore, the depth can vary across the sipe.

The present invention being a snow tire relies heavily on the edges created by the sipes for traction. For that reason the depth of the sipes are almost full depth except for that portion intersecting a groove 24,36.

Figure 4A:
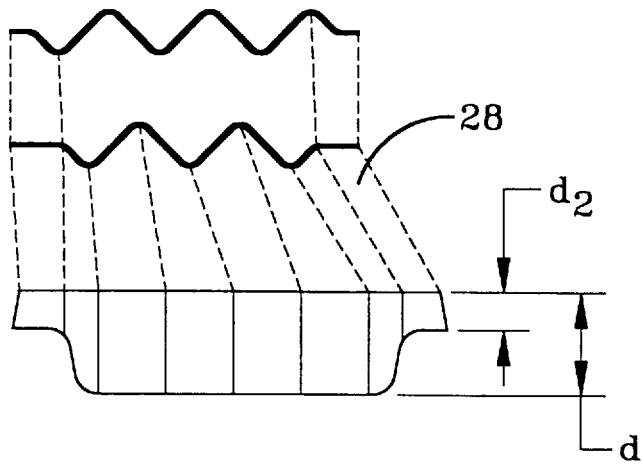
FIGS. 4A through 4E illustrate cross sectional views of the tread elements, grooves and sipes taken from FIG. 3.

FIG. 4A illustrates the sipe 28 of a center row traction element 20. The depth (d) is about 70% of the nonskid depth, the nonskid depth being the depth of radially outer surface relative to the surface of the tread base 18. At the intersection of the grooves 24 the depth ($d_2$) of the sipe is reduced to about 25% of the nonskid.

Figure 4B:
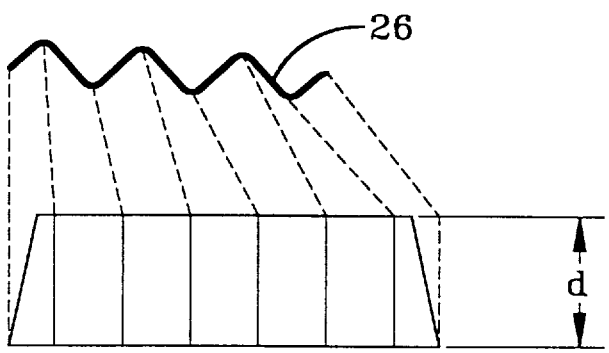

In FIG. 4B the narrow lateral groove 26 is shown having a radial depth (d) of 90% of the nonskid depth (dns) across the entire groove length.

Figure 4C:
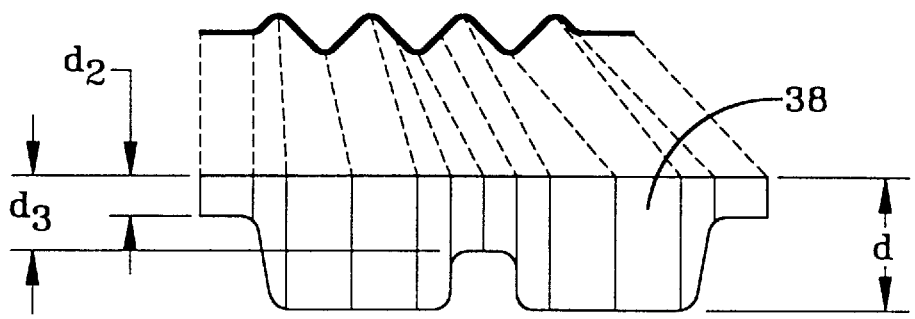

In FIG. 4C the sipe 38 of the shoulder traction element has a depth (d) of 90% of the nonskid depth (dns) except at the center of the sipe 38 where the depth ($d_2$) is only 50% of the nonskid and at the intersection of the lateral grooves 36 a depth ($d_3$) of 25% of the nonskid occurs.

Figure 4D:
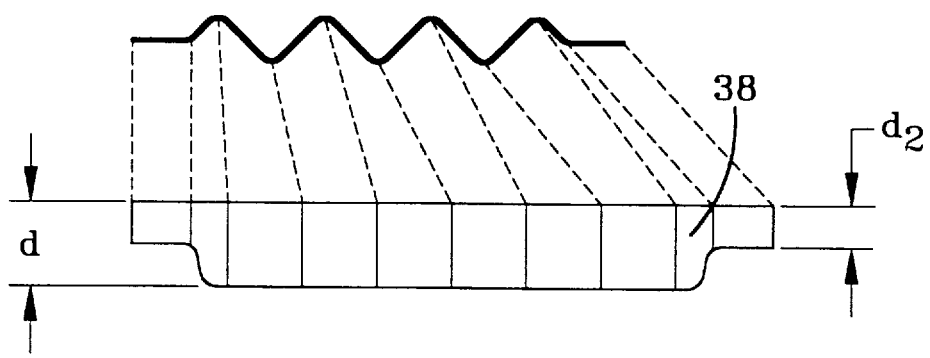

FIG. 4D the sipe 38 closest the lateral edges has a depth (d) of 70% of the nonskid except at the intersection of the grooves 36 where the depth ($d_2$) is only 25% of the nonskid.

Figure 4E:
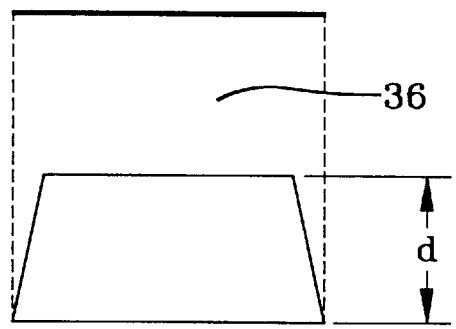

FIG. 4E shows the depth of the narrow lateral groove 36 the depth (d) being 90% of the nonskid.

The above cross sectional views of the various components show the effort to maximize the useful life of the tread in terms of traction performance while also maintaining the structural integrity of the tread elements 20,30. It is believed important that the two or more circumferentially wavy sipes 38 of the shoulder elements 30 have radial depths in the range of 50% to 100% of the radial height of the traction elements 30 over a majority of the sipe length.

It is further believed preferable that the sipes 28,38 have a sawtooth configuration. Alternatively, the pattern can be somewhat sinusoidal to facilitate fabrication of the blades which form the sipes.

Figure 5:
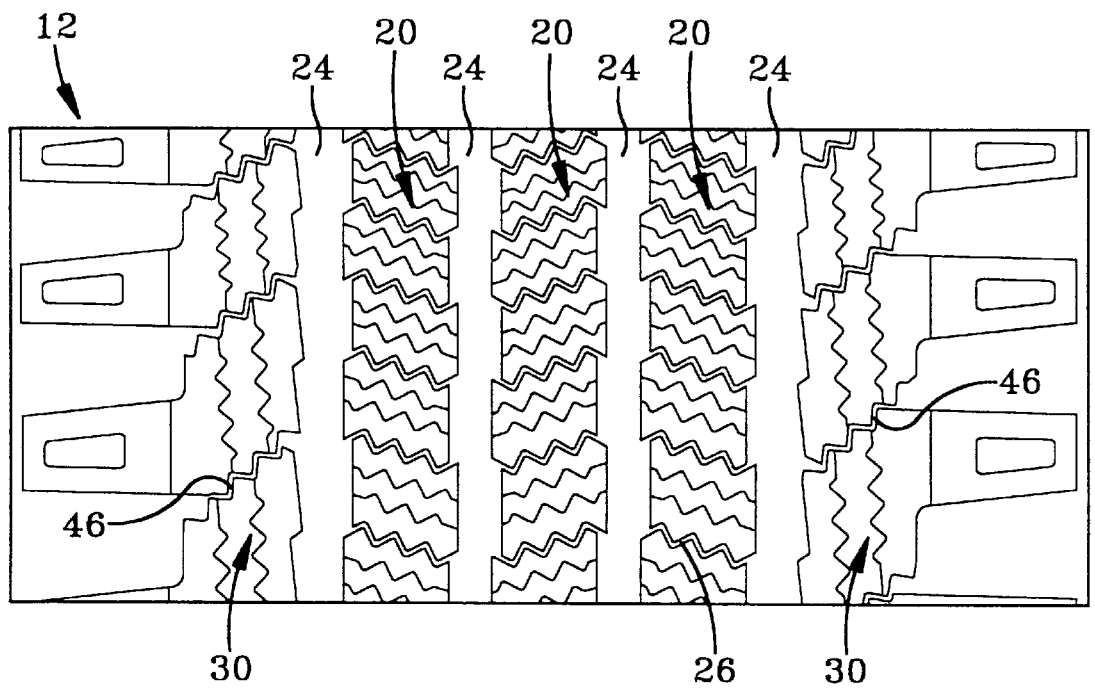
FIGS. 5, 6 and 7 are views of a portion of alternative embodiment tires according to the present invention.

FIG. 5 shows an alternative embodiment of the invention wherein the narrow grooves 46 are of a wavy pattern similar to the narrow groove 26 as opposed to being of the straight groove 36 shown in FIG. 1.

Figure 6:
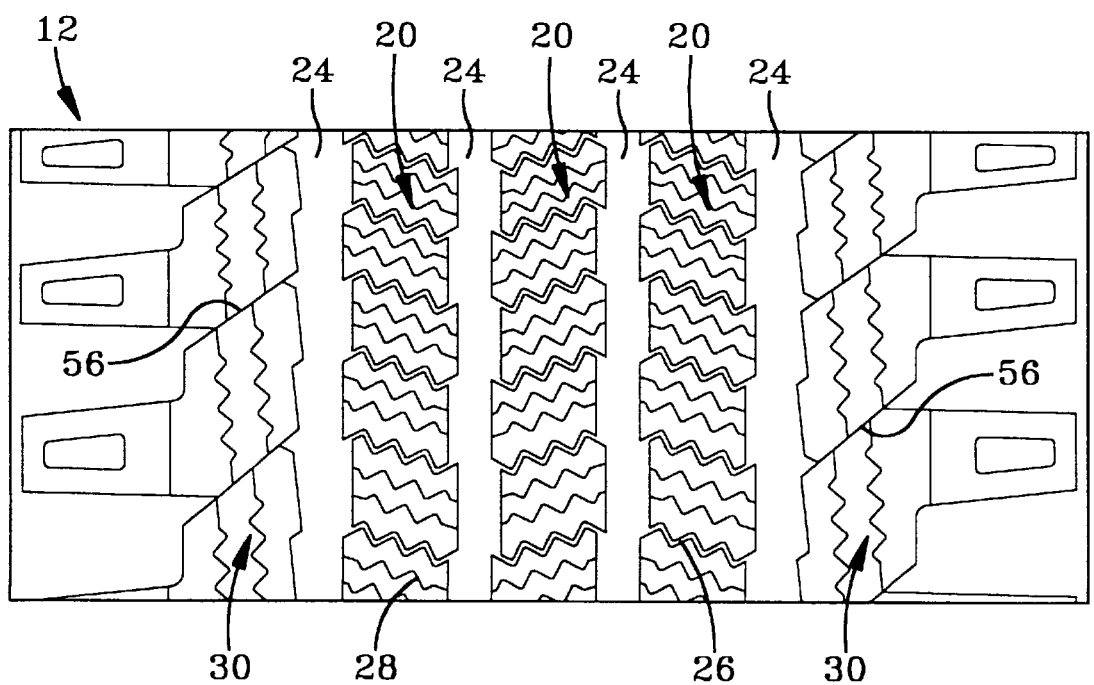

Alternatively as shown in FIG. 6 groove 56 can be formed as narrow as a sipe having either the wavy or the straight line configuration. This alternative configuration can improve the noise dampening effect of the tread 12 and further tends to stiffen the shoulder row of elements 30 by effectively making the shoulder into a rib-type construction.

A preferred tread 12 however is as shown in FIGS. 1–4E having superior traction and excellent noise dampening achieved in part by reducing the number of narrow grooves 36 in each of the shoulder rows to about half the number employed in each of the central rows of elements 20. Also the groove 36 being inclined somewhat circumferentially and opening into a large noise diffusing outer portion 58 of the shoulder creates additional sound deadening properties.

Figure 7:
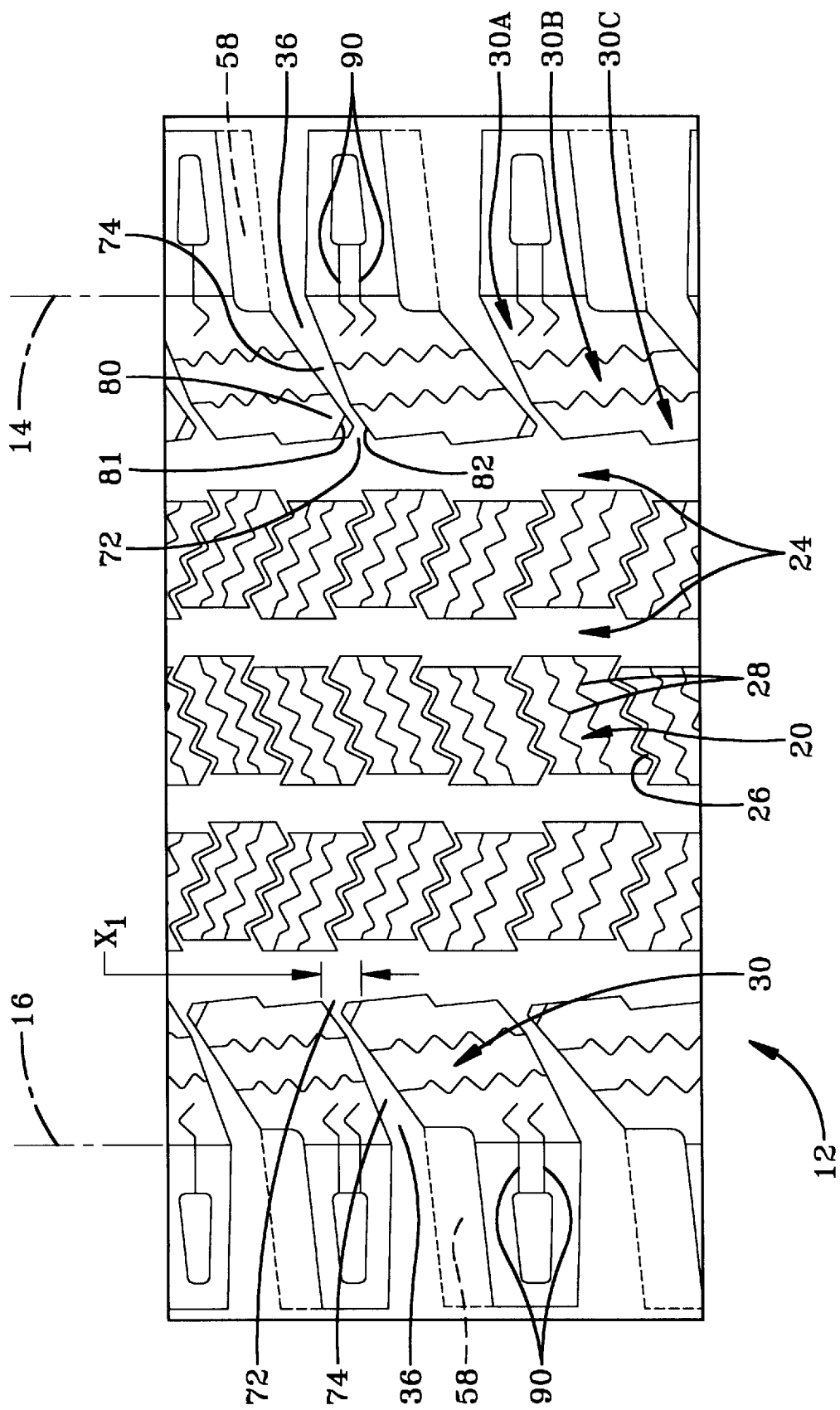

A more preferred alternative embodiment tread 12 of the invention is illustrated in FIG. 7. The lateral grooves 36 have been modified to include a first portion 72 and a second portion 74. The first portion 72 intersects the circumferential groove 24 and has a first or leading groove wall 80 including a chamfer 81 and a trailing groove or second groove wall 82. The distance at the intersection of the groove 24 of the first and second groove walls 80,82 is about equal to the nominal groove width of the circumferential groove 24, the distance $X_1$, being about 9 mm. the groove walls 80,82 narrow to a minimal distance as it extends outwardly toward the shoulder the minimum distance is about 3 mm or $\frac{1}{3} X_1$. As the groove 36 extends outwardly from the minimal point 85 to the noise diffusing portion 58 it widens in groove width to between $\frac{2}{3}$ to 100% $X_1$, preferably about 75% of $X_1$. This widening of the groove 36 greatly enhances snow traction and has demonstrated an additional 8.5% improvement in curved aquaplaning performance of the tire of FIG. 7 when compared to the tire of FIGS. 1–4B. This improvement is directly attributable to the change in the groove 36 shape. As a further enhancement, a pair sipes 90 where added to each shoulder block element. The sipes 90 are laterally extending and further enhance ice traction while increasing the circumferential flexibility of the tread shoulder block portion 30A. This widening of the lateral groove still exhibits acceptable noise properties because the narrowing and subsequent widening of the groove coupled with the sipes 90 diffuse and dampen the noise energy such that the tire remains remarkably quiet for its intended application.

Figure 8:
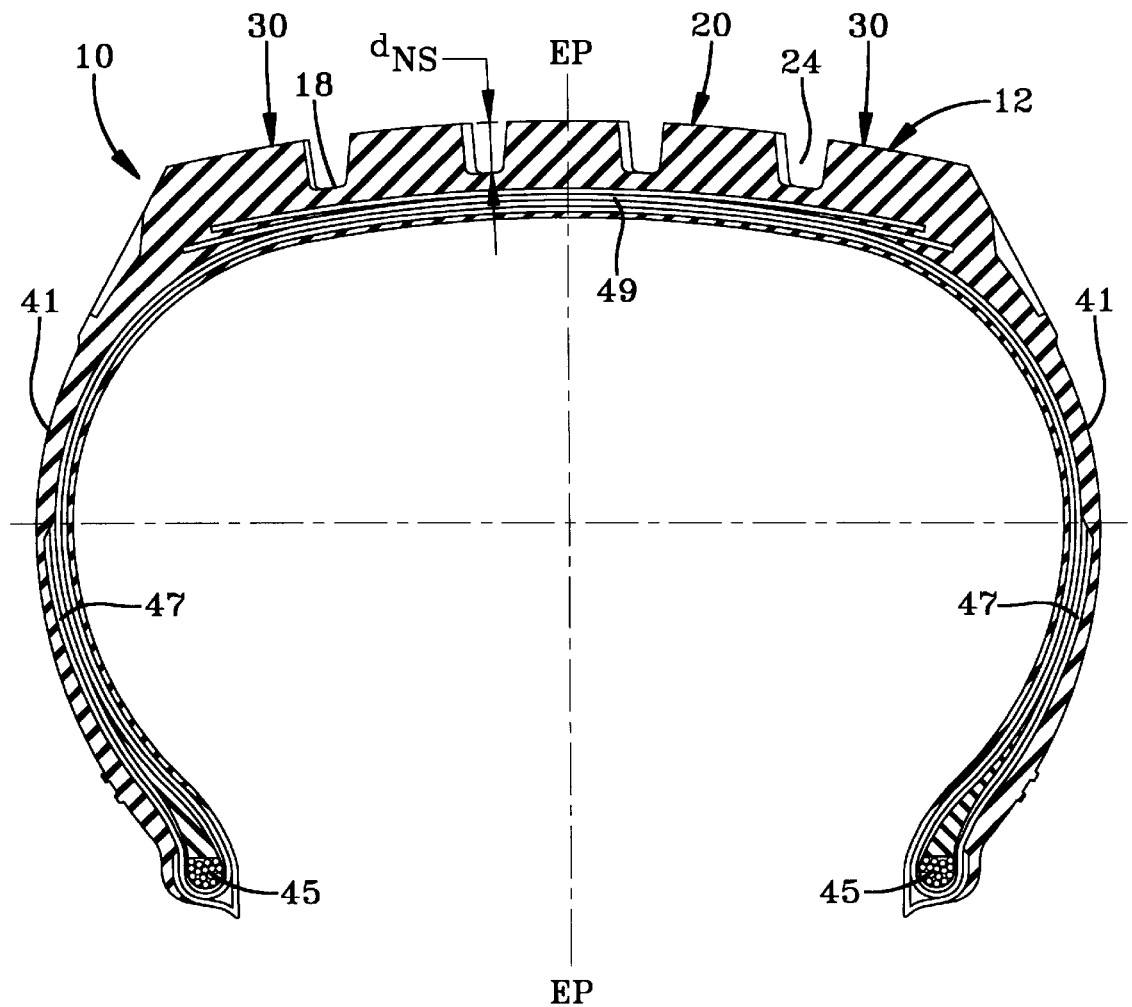
FIG. 8 is a cross sectional view of a tire 10 according to the present invention.

FIG. 8 is a cross sectional view of the tire 10 employing the novel tread 12 is shown. The tire 10 of the preferred embodiment has a carcass a pair of annular beads 45, a pair of radial plies 47, extending from bead 45 to bead 45 and wrapped at about each bead 45, a belt reinforcement 49 radially above the plies 47 and a pair of sidewalls 41, one sidewall 41 extending from each bead 45 to the tread 12. The tread is radially outward and adjacent the belt reinforcement 49. Those skilled in the art can appreciate that the number of plies 47 and belts 49 employed can be any number including but not limited to a single ply or a single pair of belt reinforcements.

What is claimed is:

1. A radial ply pneumatic light truck or automobile tire having a tread, the tread having an axis of rotation, a pair of lateral edges, a tread width (TW) defined as the axial distance between the lateral edges, and an equatorial plane perpendicular to the axis of rotation and spaced equidistant from the lateral edges, the tread comprising:

a tread base;

a plurality of traction elements extending radially outwardly from the tread base;

a plurality of circumferentially continuous wide grooves extending radially from the tread base and dividing the plurality of traction elements into a plurality of rows of traction elements, one shoulder row being adjacent each lateral edge and two or more central rows of traction elements being disposed between the shoulder rows;

a plurality of narrow laterally inclined grooves separating each circumferentially adjacent traction element, the narrow grooves separating the central rows of traction elements being of a wavy pattern having at least three substantially equal peak amplitudes;

a plurality of laterally extending wavy patterned sipes extending across and dividing each traction element within the central rows into at least three zigzag portions, the wavy patterned sipes having two or more substantially equal peak amplitudes, for each traction element within a central row one peak amplitude of each of the sipes in the traction element and of each of the narrow grooves which define a respective edge of the traction element being aligned in a linear path (L), the linear path (L) being inclined relative to the equatorial plane at an angle θ, θ being less than 45°, the traction elements of one of the central rows having the linear path (L) oppositely inclined relative to the inclination of the linear path (L) of the traction elements of an axially adjacent central row; and wherein at least one of the shoulder rows has traction elements having a circumferential length approximately twice that of the circumferential length of the traction elements of the central rows, each traction element of the shoulder rows having an end having two straight portions adjacent the circumferential groove, both straight portions being inclined relative to the equatorial plane at an angle $θ_2$, $θ_2$ being less than 45° and opposite in inclination of the linear path (L) of the axially adjacent central row, the narrow laterally inclined grooves separating the traction elements of the shoulder rows each having an axially inner end intersecting the circumferential groove, the inner end defined by a first and a second groove wall, the first groove wall having a chamfer.

2. The radial pneumatic light truck or automobile tire of claim 1 wherein each traction element of the central rows has substantially straight circumferentially extending ends adjacent the circumferential grooves, wherein the circumferentially adjacent elements within each row have the circumferentially extending ends axially offset relative to each other.

3. The radial ply pneumatic light truck or automobile tire of claim 1 wherein each traction element of the at least one shoulder row has two or more circumferentially extending wavy pattern sipes extending across the traction element intersecting the narrow lateral grooves and dividing the element into at least three portions.

4. The radial ply pneumatic light truck or automobile tire of claim 3 wherein the two or more circumferentially extending wavy sipes have a radial depth in the range of 50% to 100% of the radial height of the shoulder row traction element over a majority of the sipes lengths.

5. The pneumatic radial ply light truck or automobile tire of claim 1 wherein the tread has three central rows of traction elements.

6. The pneumatic radial light truck or automobile tire of claim 1 wherein the wavy pattern of the sipes is substantially a saw tooth configuration.

7. The pneumatic radial light truck or automobile tire of claim 1 wherein the wavy pattern of the sipes is substantially sinusoidal.

8. The pneumatic radial light truck or automobile tire of claim 1 wherein a distance (d) between adjacent peak amplitudes of adjacent sipes within a traction element is less than or equal to an amplitudal distance (A) between the adjacent peaks of one of the adjacent sipes.

9. The radial ply pneumatic light truck and tire of claim 1 wherein a distance $\chi_1$ between the first and second groove wall at the intersection of the circumferential groove is about equal to the width of the circumferential groove as measured at the radially outer surface of the tread.

10. The radial ply pneumatic light truck or automobile tire of claim 9 wherein the lateral groove narrows to a minimum width of less than $\frac{1}{3}\chi_1$ adjacent the chamfer and widens thereafter as it extends axially outwardly to the shoulder to a maximum of 75% to 100% $\chi_1$.

11. A radial ply pneumatic light truck or automobile tire having a tread having an axis of rotation, a pair of lateral edges, a tread width (TW) defined as the axial distance between the lateral edges, and an equatorial plane perpendicular to the axis of rotation and spaced equidistant from the lateral edges, the tread comprising:

a tread base;

a plurality of traction elements extending radially outwardly from the tread base;

a plurality of circumferentially continuous wide grooves extending radially from the tread base and dividing the plurality of traction elements into a plurality of rows of traction elements, one shoulder row being adjacent each lateral edge and two or more central rows of traction elements being disposed between the shoulder rows;

a plurality of narrow laterally inclined grooves separating each circumferentially adjacent traction element;

a plurality of laterally extending sipes, at least two laterally extending sipes extending across and dividing each traction element within the central rows into at least three portions;

a plurality of circumferentially extending sipes, at least two circumferentially extending sipes extending across and dividing each traction element within at least one shoulder row into at least three portions, and wherein the laterally extending grooves and sipes of the central rows of traction elements have a wavy pattern which divides each traction element within the central rows into at least three zigzag portions, the wavy patterned laterally extending sipes and grooves of the central rows having two or more substantially equal peak amplitudes, for each traction element within a central row one peak amplitude of each of the sipes in the traction element and of each of the narrow grooves which define a respective edge of the traction element being aligned in a linear path (L), the linear path (L) being inclined relative to the equatorial plane at an angle θ, θ being less than 45°, the traction elements of one of the central rows having the linear path (L) oppositely inclined relative to the inclination of the linear path (L) of the traction elements of an axially adjacent central row; and the traction elements in the shoulder row includes a pair of lateral extending sipe adjacent the tread edge.

12. The radial pneumatic light truck or automobile tire of claim 11 wherein each traction element of the central rows has substantially straight circumferentially extending ends adjacent the circumferential grooves, wherein the circumferentially adjacent elements within each row have the circumferentially extending ends axially offset relative to each other.

13. The radial ply pneumatic light truck or automobile tire of claim 11 wherein at least one of the shoulder rows has traction elements having a circumferential length approximately twice that of the circumferential length of the traction elements of the central rows.

14. The radial ply pneumatic light truck or automobile tire of claim 11 wherein the two or more circumferentially extending sipes have a radial depth in the range of 50% to 100% of the radial height of the shoulder row traction element over a majority of the sipes lengths.

15. The pneumatic radial ply light truck or automobile tire of claim 11 wherein the tread has three central rows of traction elements.

16. The pneumatic radial light truck or automobile tire of claim 11 wherein the pattern of the sipes is substantially a saw tooth configuration.

17. The pneumatic radial light truck or automobile tire of claim 11 wherein the pattern of the sipes is substantially sinusoidal.

18. The radial ply pneumatic light truck or automobile tire of claim 11 wherein each traction element of the shoulder rows has an end having two straight portions adjacent the circumferential groove, both straight portions being inclined relative to the equatorial plane at an angle $\theta_2$, $\theta_2$ less than 45° and opposite in inclination of the linear path (L) of the axially adjacent central row.

19. The pneumatic radial light truck or automobile tire of claim 11 wherein a distance (d) between adjacent peak amplitudes of adjacent sipes within a traction element is less than or equal to an amplitudal distance (A) between the adjacent peaks of one of the adjacent sipes.

* * * * *